(No Model.)

W. H. STEDMAN.
SURFACE AND SCRATCH GAGE.

No. 375,901. Patented Jan. 3, 1888.

Witnesses.
Geo. B. Kimball.
Allen Tenny.

Inventor.
William H. Stedman
By his Attorney
Frank H. Allen

UNITED STATES PATENT OFFICE.

WILLIAM H. STEDMAN, OF NORWICH, CONNECTICUT.

SURFACE AND SCRATCH GAGE.

SPECIFICATION forming part of Letters Patent No. 375,901, dated January 3, 1888.

Application filed September 1, 1887. Serial No. 248,436. (No model.)

*To all whom it may concern:*

Be it known that I, WILLIAM H. STEDMAN, a citizen of the United States, residing at Norwich, in the county of New London and State of Connecticut, have made certain new and useful Improvements in Surface and Scratch Gages, which improvements are fully set forth and described in the following specification, reference being had to the accompanying sheet of drawings, in which—

Figure 1:
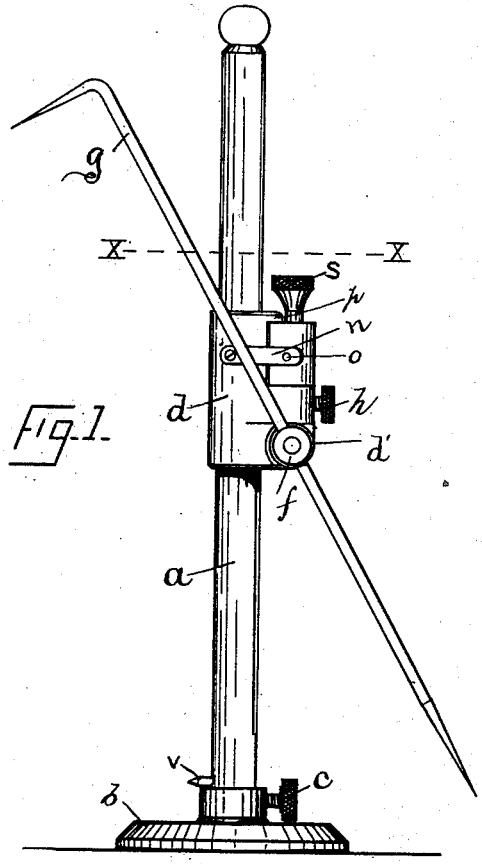
Figure 2:
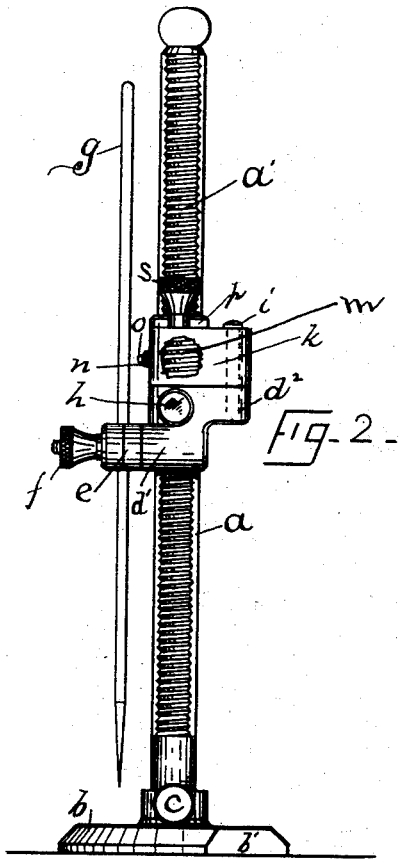
Figure 3:
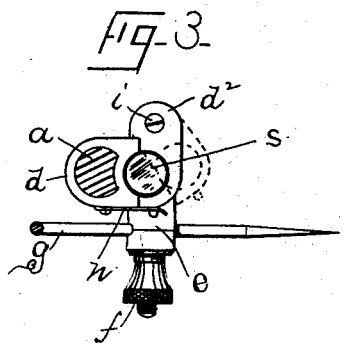
Figure 4:
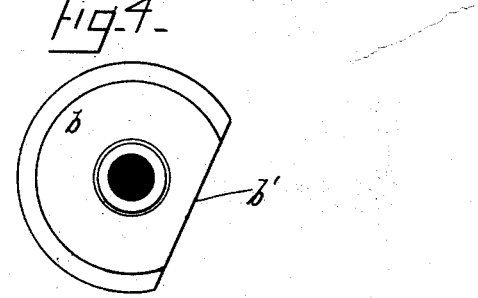

Figure 1 is an elevation of my complete gage. Fig. 2 is an elevation of the same looking from the right-hand side of Fig. 1. Fig. 3 is a cross-section on line X X of Fig. 1, and Fig. 4 is a plan of the base.

My invention is in the class of tools used commonly by mechanics for gaging and testing plane surfaces and in "scratch-marking" metals to be planed, filed, or otherwise worked; and said invention has for its object, first, the improvement of the devices by means of which a fine adjustment of the pointer is attained; second, a ready means of quick adjustment of said pointer, so that it may be moved from end to end of the supporting-standard independent of the said fine adjustment; third, a base-block cut away on one side, as hereinafter explained; fourth, an improved construction that admits of said gage being used as a scratch-gage; and, fifth, certain details of construction which I have improved in carrying into practical effect the above-named invention.

I am fully aware that surface gages have been used heretofore which have been provided with means for a delicate adjustment of the pointer; but, so far as I am familiar with such devices, this fine adjustment has been available only for limited distances—that is to say, the pointer must be set approximately correct. Then it may be adjusted by a nut and screw device until absolutely correct. In using such a tool, in practice it frequently occurs that the nut by which the fine adjustment is attained is in the position left when last used—which, for illustration, we will assume is at the lower end of the screw. The operator, without noticing the position of the nut, sets the pointer approximately correct and tightens it by its binding-screw. Now, when he attempts to use the fine adjustment to lower the pointer down to the surface which he wishes to gage, he discovers that the adjusting-nut is at the end of its screw, and he must therefore run the fine adjustment-nut up midway the length of its screw and then reset the pointer, causing both loss of time and considerable annoyance, all of which is avoided in my new form of gage. In a gage as here shown the device for fine adjustment is always ready for use and may be utilized at any point throughout the length of the standard.

Referring to the annexed drawings, the letter $a$ indicates the main standard or supporting-bar of my gage, and $b$ a metallic base bored or cored to receive the lower end of said standard, which standard is retained in place within said base by a thumb-screw, $c$. As here shown, standard $a$ is of general circular shape in cross-section, having in one side throughout its length a rack, $a'$, formed with a pitch of perhaps twenty-four to thirty threads to an inch.

$d$ indicates a block or carriage fitted to slide freely on standard $a$, having a lateral projection, $d'$, provided with a clamp, $e$, and thumb-nut $f$, by means of which a pointer, $g$, may be clamped at varying degrees of inclination, said pointer and its clamping device being substantially the same as in other gages of this class.

$h$ indicates a thumb-screw, by means of which carriage $d$ may be immovably fastened in a given position on the standard to prevent displacement of the pointer after the proper adjustment is reached. Carriage $d$ is also formed with a second lateral projection, $d^2$, to which is hinged, by a screw, $i$, a block, $k$, having journaled therein a vertical screw, $m$, of suitable size and pitch to engage and travel in the rack $a'$, above described, said screw $m$ being held in close engagement with the rack by a spring-latch, $n$, secured to carriage $d$ and having a perforation in its free end which snaps over a pin, $o$, when block $k$ is swung into its closed position. To prevent endwise play of the block $k$, I preferably form carriage $d$ with a lip, $p$, which projects over the upper end of said block.

Screw $m$ may be rotated within block $k$ by a milled thumb-piece, $s$, secured to said screw and projecting above said block. When it is desired to use my described gage, the pointer $g$ is adjusted at an angle best adapted to the work to be gaged. The block $k$ is swung outward, as indicated in dotted lines in Fig. 3, thus throwing screw $m$ out of engagement with the rack. Carriage $d$ may then be freely moved upward or downward on standard $a$ until the pointer is almost in contact with the work to be gaged, when block $k$ is swung back to its closed position. Now, by rotating thumb-piece $s$, screw $m$ is caused to travel slowly in rack $a'$, carrying with it carriage $d$ and the pointer. It will be noticed, by referring to Fig. 2 of the drawings, that it makes no difference at what point on the standard $a$ the carriage is clamped. The fine adjustment attained by the rack-and-screw mechanism is available at any point throughout the length of said standard.

Base $b$ is preferably cut away, as at $b'$ in Figs. 2 and 4, so that the gage may be placed and used closer to a side wall than if left a complete circle.

The foregoing description sets forth my improved surface-gage. In order to convert the same, without appreciable expense, into a scratch-gage, I remove the pointer $g$, provide a scratch-pin, $v$, in standard $a$, and remove base $b$ by unscrewing the binding-screw $c$. Carriage $d$ may then be adjusted on standard $a$, precisely as above described. The pin $v$ forms a stop to limit the entrance of the standard into the base when used as a surface gage.

My entire construction is easily understood and operated and provides two practical tools in one and at the price of one.

Having described my invention and the mode of its operation, I claim as new and wish to secure by Letters Patent—

1. In a surface-gage, the combination of an upright standard having a rack throughout its length, as set forth, a base removably secured thereto, and a carriage fitted to slide on said standard, carrying both a pointer and an adjusting-screw, which may be thrown into and out of engagement with said rack, as and for the purpose specified.

2. The combination of standard $a$, having a rack throughout its length and a scratch-pin at one end, as set forth, carriage $d$, movably fitted on said standard, having hinged thereto block $k$, carrying screw $m$, and a spring-latch for holding said screw in engagement with said rack, as described, and for the purpose specified.

3. In a surface-gage, the combination of an upright standard having a rack throughout its length, as set forth, a base removably secured thereto, and a carriage fitted to slide on said standard, carrying both a pointer and an adjusting-screw, which may be thrown into and out of engagement with said rack, said supporting-base being cut away on one side, as and for the purpose specified.

WILLIAM H. STEDMAN.

Witnesses:
FRANK H. ALLEN,
GEORGE B. KIMBALL.